United States Patent
Noe et al.

(10) Patent No.: US 9,784,574 B2
(45) Date of Patent: Oct. 10, 2017

(54) ROLL FOR MEASURING STRIP FLATNESS

(71) Applicants: Andreas Noe, Kerken (DE); Marc Werner, Kamp-Linfort (DE); Christoph Moos, Isselburg (DE)

(72) Inventors: Andreas Noe, Kerken (DE); Marc Werner, Kamp-Linfort (DE); Christoph Moos, Isselburg (DE)

(73) Assignee: BWG BERGWERK- UND WALZWERK-MASCHINEBAU GMBH, Duisburg (DE)

(*) Notice: Subject to any disclaimer, the term of this patent is extended or adjusted under 35 U.S.C. 154(b) by 108 days.

(21) Appl. No.: 14/883,009

(22) Filed: Oct. 14, 2015

(65) Prior Publication Data

US 2016/0109231 A1 Apr. 21, 2016

(30) Foreign Application Priority Data

Oct. 16, 2014 (DE) .......................... 10 2014 115 023

(51) Int. Cl.
| | |
|---|---|
| *G01B 21/20* | (2006.01) |
| *G01B 21/30* | (2006.01) |
| *B21B 38/02* | (2006.01) |
| *B21B 38/06* | (2006.01) |

(52) U.S. Cl.
CPC .............. *G01B 21/30* (2013.01); *B21B 38/02* (2013.01); *B21B 38/06* (2013.01)

(58) Field of Classification Search
CPC ........ G01B 7/287; G01B 7/345; G01B 11/18; G01B 21/30; G01B 21/20; B21B 38/02; B21B 38/06; B21B 39/008; B21B 37/68
USPC ................................................ 33/533, 501.02
See application file for complete search history.

(56) References Cited

U.S. PATENT DOCUMENTS

| | | | | |
|---|---|---|---|---|
| 5,557,100 A * | 9/1996 | Jeuniaux | ................. | B21B 38/02 250/227.16 |
| 5,629,487 A * | 5/1997 | Mucke | .................... | B21B 38/02 73/818 |
| 6,354,013 B1 * | 3/2002 | Mucke | .................... | B21B 38/02 33/501.02 |
| 6,606,919 B2 * | 8/2003 | Perenon | .................. | B21B 38/02 73/862.453 |
| 6,668,626 B2 * | 12/2003 | Grefve | .................... | B21B 38/02 72/18.7 |

(Continued)

FOREIGN PATENT DOCUMENTS

DE 4135614 A 5/1993

*Primary Examiner* — Yaritza Guadalupe-McCall
(74) *Attorney, Agent, or Firm* — Andrew Wilford

(57) ABSTRACT

A flatness-measuring roll for detecting flatness defects of a metal strip extending and moving in a strip-travel direction has a roll body having a cylindrical outer surface and a central axis extending generally perpendicular to the strip-travel direction and about which the body is rotatable. A plurality of measuring bars axially spaced along the body, recessed in the body, and having outer faces flush with the body surface are each at least limitedly radially shiftable relative to the body. The bars are angularly elongated, each extend along a plane substantially perpendicular to the roll axis, and each have a constant width measured parallel to the roll axis over generally all of a respective total angular length. At least two respective force-measuring sensors are braced radially between each of the bars and the roll body.

16 Claims, 4 Drawing Sheets

(56) References Cited

U.S. PATENT DOCUMENTS

| | | | |
|---|---|---|---|
| 6,729,757 B2* | 5/2004 | Faure | B21B 38/02 33/533 |
| 6,853,927 B2* | 2/2005 | Noe | B21B 38/02 702/41 |
| 7,357,022 B2* | 4/2008 | Noe | B21B 38/02 73/105 |
| 7,430,887 B2* | 10/2008 | Mucke | B21B 38/02 33/533 |
| 8,132,475 B2 | 3/2012 | Noe | |
| 8,236,141 B2* | 8/2012 | Pak | D21F 3/08 162/363 |
| 8,814,076 B2 | 8/2014 | Ingvarsson | |
| 9,080,287 B2* | 7/2015 | Gustafson | D21F 3/06 |
| 9,650,744 B2* | 5/2017 | Gustafson | D21F 7/06 |
| 2003/0236637 A1* | 12/2003 | Noe | B21B 38/02 702/41 |
| 2016/0109231 A1* | 4/2016 | Noe | B21B 38/02 33/533 |

* cited by examiner

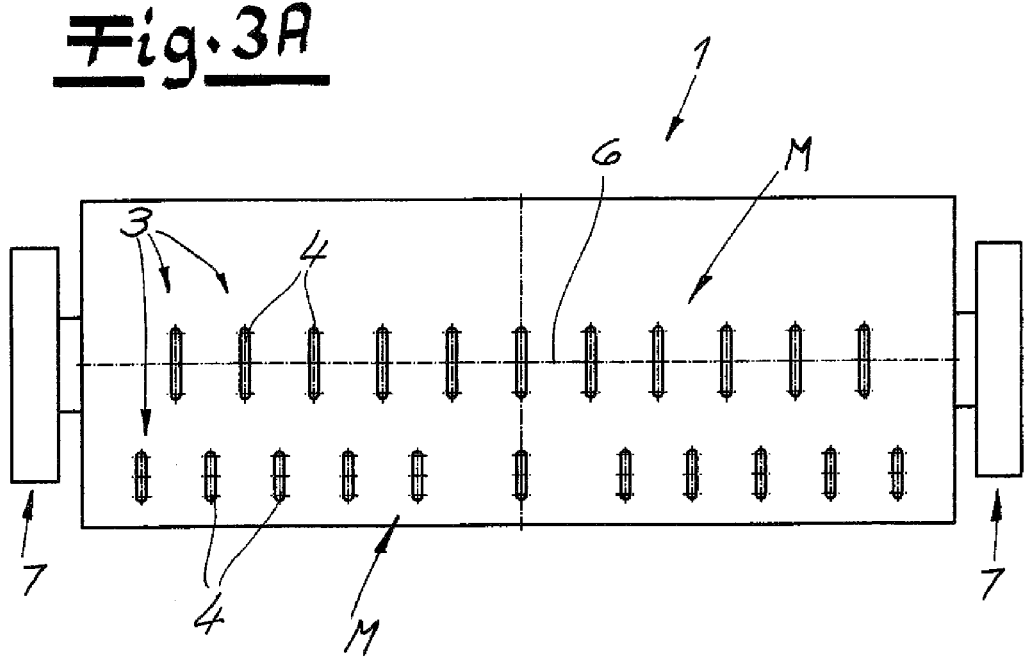
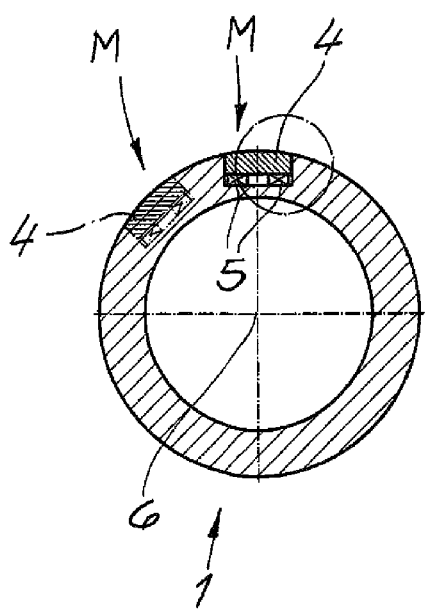

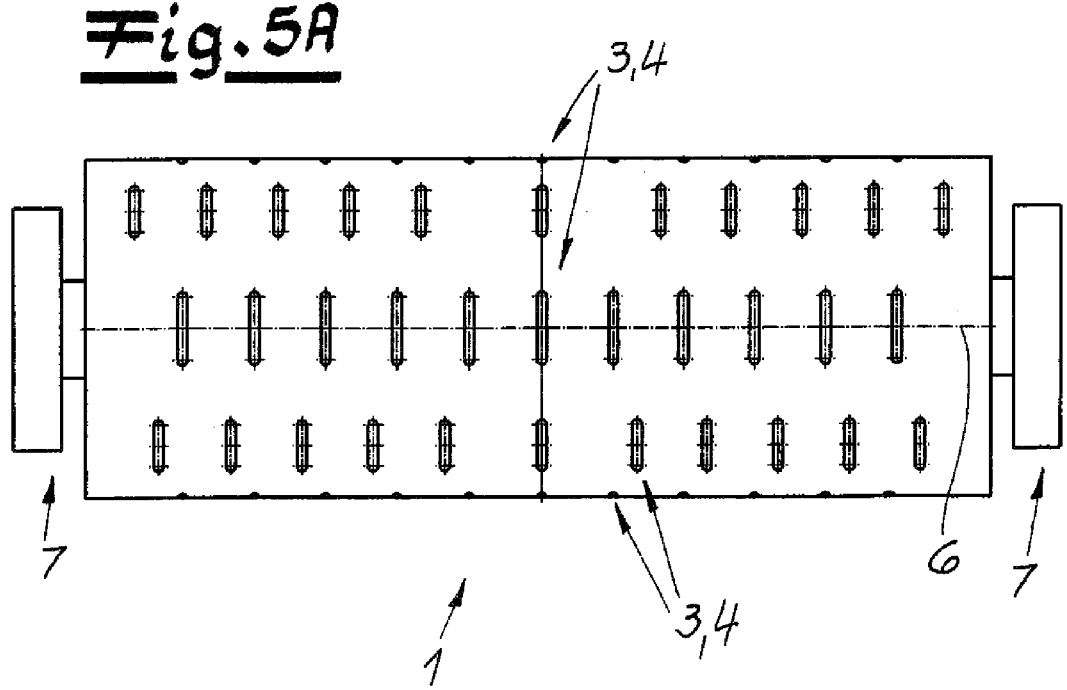
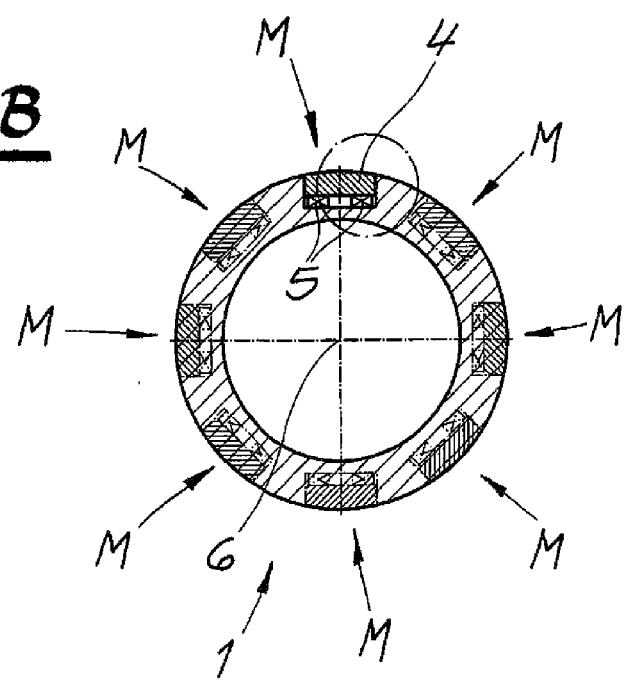

ROLL FOR MEASURING STRIP FLATNESS

FIELD OF THE INVENTION

The present invention relates to a flatness-measuring roll for detecting flatness defects of a strip, particularly a metal strip, by measuring the distribution of strip tension over the strip width.

BACKGROUND OF THE INVENTION

Such a roll typically has a plurality of measuring sites integrated into the roll surface and distributed along the roll length at different axial positions for measuring the strip tension, and the measuring sites each have one measuring body flush with the roll surface and carried on one or a plurality of force-measuring sensors.

The flatness-measuring roll detects flatness defects in strips, particularly metal strips, by measuring the distribution of strip tension over the strip width, that is transversely to the strip-travel direction. The entire width of the tensioned strip wraps the flatness-measuring roll at a specified wrap angle and, in doing so, exerts with respect to the local longitudinal tension distribution in the direction of the strip width local contact forces radially inward onto the flatness measurement roll, from which the distribution of strip tension can be detected. Strip defects and, in particular, ripples and strip sabers can then be directly determined from the distribution of strip tension over the strip width because length deviations of individual strip sections are represented by tension differences.

The measuring units at the individual measuring sites have covers that act upon the force-measuring sensors, for example, piezoelectric crystals, situated underneath these covers. Here, it is appropriate to brace the covers against the roll by interposing the piezoelectric quartz. In order to minimize a force transmission between the measuring bodies or the covers on the one hand and the roll body on the other, the measuring bodies or the covers are decoupled from the roll surface by a fully surrounding gap and are exclusively braced against the force sensors, without having further contact with the roll. The measuring bodies or covers are completely and without any noteworthy deformation of the cover subsequently moved against the force-measuring sensors when stressed.

Such measuring rolls are, for example, known from U.S. Pat. No. 5,629,487 or U.S. Pat. No. 7,357,022.

In the flatness-measuring roll known from above-cited U.S. Pat. No. 5,629,487 the measuring bodies are annular covers that each rest on a respective load cell. A plurality of such measuring sites are distributed over the strip width so that the individual measuring sites detect the strip tension for different axial positions. Here, the measuring sites are distributed not only over the strip width but also angularly around the roll. Each measuring site enables making a measurement during each rotation.

DE 10 2004 008 303 disclosed a flatness-measuring roll that has, in the roll surface, flatness sensor bars integrated as measuring bodies, supported on the sensors, and extending obliquely to the roll axis and to the strip-travel direction for determining the tension distribution over the strip width so that such a sensor bar extends over a specified width area on the one hand and over a specified angular extent of the roll area on the other. Such a sensor bar obliquely situated to the roll axis makes it possible to take a plurality of time successive measurements for respective different axial positions of the roll and, for this reason, also of the strip, so that one measuring body (namely one sensor bar) can carry out measurements at different axial positions. Here, normally a plurality of such flatness sensor bars are distributed over the strip width and each cover a specific width range of the measuring roll or of the metal strip.

The known flatness-measuring rolls have generally been proven successful; however, they can be further developed, namely, in particular, with regard to the measuring accuracy.

Furthermore, a flatness-measuring roll is known from DE 41 35 614 in which the force-measuring sensor is covered by a bridge angularly on the roll and, here, is directly fixed on both sides by screw bolts in the cross section of the deflection roll so that during measurement a deformation of the bridge has to occur.

Similarly, a measuring roll is known from U.S. Pat. No. 8,814,076 in which the measuring site arrangements are suspended in the recesses of the roll.

OBJECTS OF THE INVENTION

It is therefore an object of the present invention to provide an improved flatness-measuring roll.

Another object is the provision of such an improved flatness-measuring roll that overcomes the above-given disadvantages, in particular that enables the detection of flatness defects by measuring the distribution of strip tension with an increased measuring accuracy while, at the same time, being simple.

SUMMARY OF THE INVENTION

A flatness-measuring roll for detecting flatness defects of a metal strip extending and moving in a strip-travel direction has according to the invention a roll body having a cylindrical outer surface and a central axis extending generally perpendicular to the strip-travel direction and about which the body is rotatable. A plurality of measuring bars axially spaced along the body, recessed in the body, and having outer faces flush with the body surface are each at least limitedly radially shiftable relative to the body. The bars are angularly elongated, each extend along a plane substantially perpendicular to the roll axis, and each have a constant width measured parallel to the roll axis over generally all of a respective total angular length. At least two respective force-measuring sensors are braced radially between each of the bars and the roll body.

The present invention is based on the discovery that the measuring accuracy can be significantly increased when the flatness-measuring roll or its measuring sites are designed so that for each roll revolution and subsequently within each measuring cycle one individual measuring site (which is formed by a measuring body on the one hand and a force-measuring sensor or force-measuring sensors on the other) is able to detect pressures at a plurality of measuring sites for a specific axial position or strip-width coordinate so that, for example, an average value may be formed from these measurements. Such multiple measurements and averaging reduces measuring uncertainties and measuring errors so that the measuring accuracy is increased. This is achieved according to the present invention in that the measuring sites are designed having measuring bodies that have over at least one part of their length a substantially constant width, so that one and the same measuring body over time detects a plurality of measurements for the same axial position. This length of the measuring body having a uniform width defines the measuring length.

While in, for example, known flatness-measuring rolls according to the state of the art having round covers the size of the contact area constantly changes when the strip passes and, for this reason, only the largest value within one measuring cycle and, as a result, for one roll revolution may be evaluated, the solution of the present invention provides the possibility of detecting a plurality of "usable measurements" per measuring cycle and, as a result, per roll revolution because representative measurements may be recorded for the same strip-width coordinate within the measuring length without these measurements being rendered inaccurate by contact areas of different sizes. Here, the measuring bodies are decoupled from the roll surface by a fully surrounding gap in a generally known manner and are exclusively braced against the force sensors. In contrast to the measuring sites known from above-cited DE 41 35 614, detecting the measurements is not carried out by deforming a measuring bridge but by fully operating the measuring body, for example, the sensor bar, so that measurements may already be detected then when the strip covers the measuring body within the measuring length only in the peripheral area.

In general, different geometric forms can be considered for the measuring body, provided that they substantially have a constant width over a specified part of the length. As a result, the measuring bodies of these covers may be designed, for example, as a square; however, it is particularly preferred that the measuring bodies are designed rectangularly (or strip-like) as sensor bars having a greater length than width. Here, the present invention is based on the discovery that a plurality of measurements for respective axial positions may be detected by a great length or measuring length of the measuring bodies (in the angular direction). Reducing the width vis-a-vis the length has the advantage that a plurality of measuring bodies may be positioned in one row next to one another along the roll length and, as a result, also over the strip width, so that the resolution of the measurement may be increased over the strip width. For this purpose, the measuring length of the measuring body is preferably longer than the contact length of the strip with the roll based on the wrap angle.

For example, given a roll diameter of 600 mm having a wrap angle of 5°, a theoretical contact length of the strip of approximately 26 mm results. For a measuring length of a sensor bar of 80 mm and a measurement per 2 mm angular travel of the sensor bar, the strip ends up contacting the sensor bar initially at 0 to 26 mm, at 2 mm to 28 mm for the next measurement, etc. At the end of a respective measurement, the contact occurs at 54 mm to 80 mm so that, in this example, 28 measurements are possible using one sensor bar for the respective strip-width coordinate for each measuring cycle.

It is particularly preferred that the measuring bodies, for example, the sensor bars, each rest on (at least) two force-measuring sensors arranged in a row (aligned) in the longitudinal direction. Preferably, they are at the ends of the sensor bars. In this case, both or a plurality of force-measuring sensors may be used for detecting the measurements in that both signals are, for example, added. In so doing, measurements may be representatively recorded in a reliable manner over the entire measuring length, independent of whether the sensor bar or the measuring body are stressed primarily in the area of one of the sensors or, for example, also between the sensors. Since the resulting measuring force travels along the sensor bar during measuring and, depending on the diameter of the roll, does not always stand exactly in the measuring direction of the force receptors, which may be offset to the radius, "measuring errors" may at least theoretically occur. These deviations are, however, very small for typical roll diameters and otherwise the possibility readily exists to recalculate and correct these deviations based on the known angular position.

Even though preferably one measuring body, for example, one sensor bar, rests on two force-measuring sensors, for example, two piezoelectric elements, it typically is within the scope of the present invention to situate the measuring body, for example, the sensor bar, merely on a centrally located force-measuring sensor and, by inter-positioning this individual force-measuring sensor, to brace the measuring body with the roll. This is, in particular, possible when the measuring body is sufficiently rigid and inflexible that in the course of the stress, that is during one contact of the strip on the bar, no noteworthy deformations occur. Preferably, one will work, however, with at least two force-measuring sensors as described above.

It is particularly preferred that a plurality of measuring sites are combined in a group of measuring sites, and such a group of measuring sites has a plurality of measuring sites in a row extending along the roll length and having spacings from one to another at a common angular position. In this manner, it may be possible by such a measuring-site group to simultaneously measure the distribution of strip tension over the strip width at one angular position of the roll. Since relatively narrow measuring bodies, for example, sensor bars, can be used, it may be possible to situate a plurality of measuring sites next to one another at a common angular position. In contrast to, for example, round covers or measuring sites, it is not necessary to position the measuring sites situated next to one another in an angularly offset manner to one another. Here, it is, for reasons of stability, appropriate to maintain a certain free minimum spacing between two adjacent measuring sites which, for example, is 20 mm to 100 mm, preferably 30 mm to 70 mm. In this manner, the stiffness of the roll is generally ensured, even though a plurality of sensor bars are situated directly next to one another.

In a further refinement of the embodiment, it may be possible to distribute a plurality of such measuring site groups or sensor bar rows angularly around the roll, and each measuring site group is situated at a different angular position. Here, the measuring sites of the measuring site groups may each be at the same axial positions or strip-width coordinates so that the measuring site groups measure at the same respective strip-width coordinates. In this case, it may be possible to carry out, during one roll revolution, a complete measurement over the strip width by each individual sensor bar group, so that the measuring accuracy is further increased by averaging. Alternatively, it may also be possible to locate the measuring sites of two measuring site groups arranged in angularly spaced rows at least partially axially offset to one another so that then different strip-width coordinates are measured by one measuring site group than by the other measuring site group. In so doing, the resolution of the measurement over the strip width cam be increased so that an almost continuous resolution is achieved. For example, when eight rows of sensor bars are provided on the outer surface of the roll, with a spacing of 50 mm within each row, a resolution of 6.25 mm in strip width direction may result in one roll revolution.

In the case of an offset arrangement, according to the invention all measuring site groups have a measuring site in a specified axial position, that is, at least one measuring site per measuring site group is always positioned at the same strip-width coordinate, for example, always in the center of the strip. Such a measuring site may be used as a reference. Provided that the measurement results in deviations at the same strip-width coordinate, strip tensile variations may be concluded, so that, with the aid of such a reference, strip-tension variations may be filtered out.

The roll may be, in a generally known manner, uncoated or coated. For this purpose, one can make use of coatings generally known, for example, of rubber/plastic or also hard coating, for example, tungsten carbide. The coating may as in known flatness-measuring rolls be adapted to the respective application purpose.

The subject of the present invention is also a method for determining flatness defects of a strip by measuring the distribution of strip tension over the strip width using a flatness-measuring roll of the described type. This method distinguishes itself in that for each roll revolution a plurality of measurements are detected for the respective axial position by the measuring sites. Preferably, an average value is able to be determined from the measurements detected by the measuring site for the respective axial position. The contact length of the strip with the measuring site or the sensor bar is, here, preferably smaller than the length of the measuring site or the sensor bar. Furthermore, it is within the scope of the present invention to carry out a reset of the force-measuring sensors each time before the strip runs onto the respective measuring sites.

BRIEF DESCRIPTION OF THE DRAWING

The above and other objects, features, and advantages will become more readily apparent from the following description, reference being made to the accompanying drawing in which:

FIGS. 3A and 3B show the roll according to FIG. 1A in a modified embodiment;

FIGS. 5A and 5B show the roll according to FIG. 1A, 1B in a modified embodiment.

SPECIFIC DESCRIPTION OF THE INVENTION

Figure 1A:
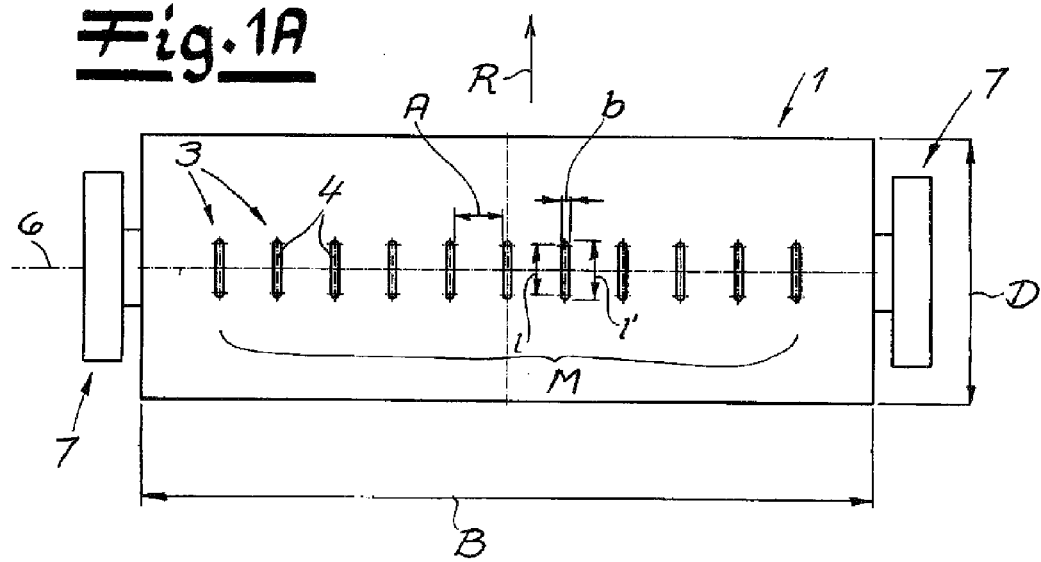
FIG. 1A is a top view of a flatness-measuring roll according to the present invention.

As seen in the drawing, a flatness-measuring roll 1 has a diameter D and can detect flatness defects of a strip 2, in particular, a metal strip, by measuring the distribution of strip tension over the strip width, here extending parallel to a horizontal center axis 6 of the roll 1. Such a flatness-measuring roll is typically passive and, as a result, integrated into a strip processing system in a non-actuated manner so that during the continuous operation the flatness of strip 2 may be detected as it wraps around the flatness-measuring roll 1 at a specified wrap angle.

Figure 2:
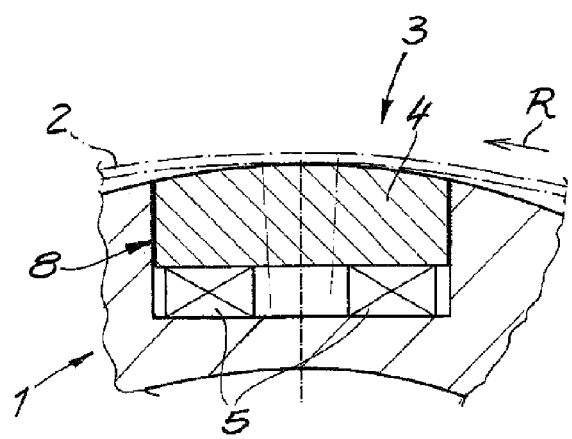
FIG. 2 is a large-scale detail of the roll according to FIG. 1B.
Figure 4A:
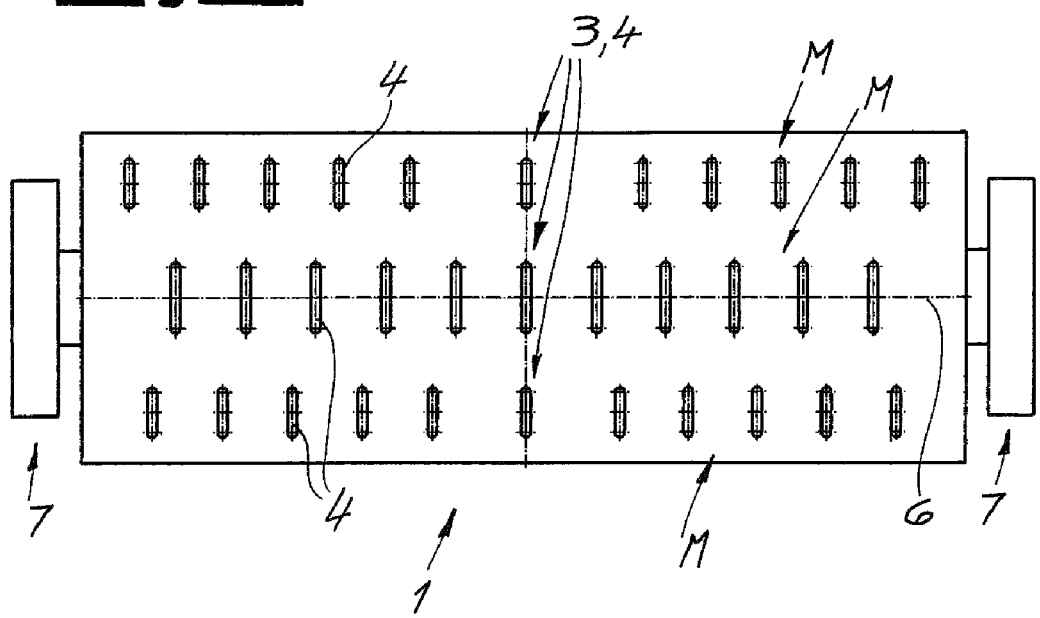
FIGS. 4A and 4B show the roll according to FIG. 1A, 1B in a further embodiment.
Figure 4B:
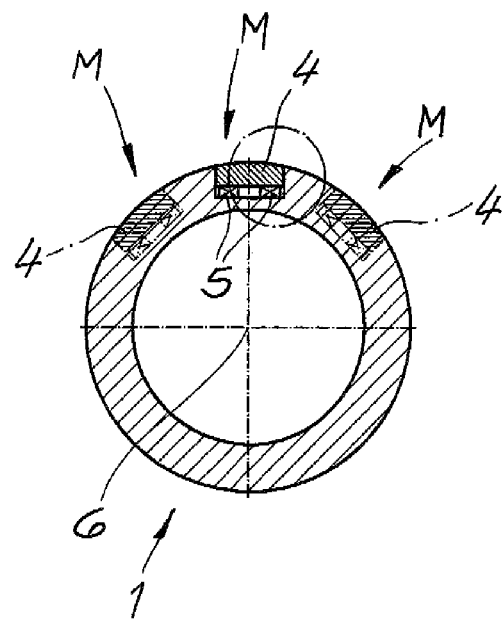

In FIG. 2, strip 2 is shown schematically. Such a flatness-measuring roll 1 has a plurality of measuring sites 3, integrated into the roll surface and situated at different axial positions distributed over roll length B for measuring the strip tension. Each measuring site 3 has one respective measuring body 4 flush with the roll surface, that, in the illustrated embodiment, is a sensor bar 4 and is situated on two load cells 5 or force-measuring sensors that may be, for example, piezoelectric crystals or measuring elements having such piezoelectric crystals. The measuring bodies 4 are braced as covers of the force-measuring sensors 5 against the roll by mounting these sensors 5, for example, with unillustrated mounting screws, mounting rods or the like. For this purpose, reference is made to the solutions generally known, for example, from DE 10 2004 008 303 or U.S. Pat. No. 8,132,475.

According to the present invention, in a top view onto the roll surface, the measuring bodies 4 are each centered on a plane perpendicular to the roll axis 6 by their longitudinal direction running in the strip-travel direction R. The sensor bars 4 do not extend obliquely to the roll axis 6 as in the related art according to DE 10 2004 008 303. Here, these sensor bars 4 have a constant width b over the most substantial part of their total length 1'. This part of total length 1' is referred to as their measuring length 1. The sensor bars 4 have a greater total length 1' and also a greater measuring length 1 than width b.

The embodiment according to the present invention makes it possible for each individual measuring site 3 to take a plurality of measurements per roll revolution for the strip tension at a respective width position of the strip. With a roll diameter D of, for example 600 mm, and a wrap angle of 5°, measurements having the same measuring site may be carried out with a measuring length 1 of sensor bar 4 of, for example, 80 mm and a measurement every 2 mm to make 28 measurements with a single measuring site for each 360° revolution of the roll 1. For this reason, the measuring accuracy is significantly increased because, for example, an average value may be established from these individual measurements with each individual roll revolution.

Figure 1B:
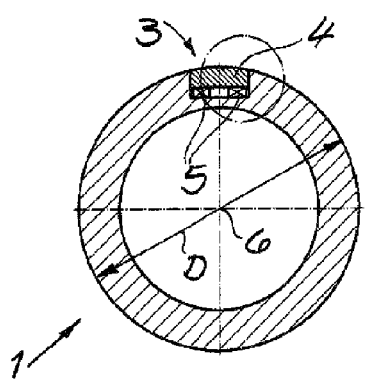
FIG. 1B is a cross section through the roll according to FIG. 1A.

FIGS. 1A and 1B her show a first embodiment in which all the measuring sites 3 form a measuring site group M extending along the roll length in a row at a common angular position or angular position with spacings A from one another, that is parallel to the axis 6. All the measuring sites 3 are, as a result, able to simultaneously determine measurements for different axial positions.

In the modified embodiment according to FIGS. 3A and 3B, two measuring site groups M are provided that are each in a respective axially extending row or in the circumferential direction and, for this purpose, are arranged in rows offset by a specified angle. As can be seen from FIG. 3A, the measuring sites 3 of these two measuring groups M are not only offset angularly but are, in particular, also arranged offset to one another axially. For this reason, the one measuring group M is able to determine measurements for different axial positions than the other measuring group M so that the resolution of the roll is increased over the strip width.

FIGS. 4A and 4B or 5A and 5B show a further refinement of this notion, because measuring groups are axially offset and able to increase the resolution over the strip width up to a measurement which is almost continuous over the strip width.

Here, it can also be seen from FIGS. 4A, 4B, 5A, and 5B that all the measuring site groups M have one of their measuring sites 3 at the same axial position, here at the center of the roll. This sensor bar 4 in the center of the roll may, as a result, be used as a reference because, using the output of this center sensor bar 4, the influence from possible temporary strip tension variations can be filtered. If, for example, two central sensor bars 4 situated directly behind one another determine different strip tensions at the same axial position, it may be ascribed to temporary strip tension variations.

Furthermore, it can be seen from the figures that the measuring roll 1 is rotatably mounted in end bearings 7 as a passive measuring roll. Alternatively, it may, however, be possible that the roll is provided with at least one drive, for example, an accelerator, to avoid slip when accelerating or slowing down. Details are not illustrated.

Individual sensor bars 4 are decoupled from the roll surface by a fully surrounding gap 8 that is only shown schematically, and the sensor bars 4 are braced only against the force sensors 5 they sit on without bearing directly on the roll body. In this manner, a force shunt is prevented or minimized in a generally known fashion. Moreover, this arrangement provides the possibility of maintaining comparable measurements by one and the same sensor bar for different contact points of the strip with the sensor bar.

We claim:

1. A flatness-measuring roll for detecting flatness defects of a metal strip extending and moving in a strip-travel direction, the roll comprising:
    a roll body having a cylindrical outer surface and a central axis extending generally perpendicular to the strip-travel direction and about which the body is rotatable;
    a plurality of measuring bars axially spaced along the body, recessed in the body, having outer faces flush with the body surface, and each at least limitedly radially shiftable relative to the body, the bars being angularly elongated and each extending along a plane substantially perpendicular to the roll axis and each having a constant width measured parallel to the roll axis over generally all of a respective total angular length;
    at least two respective force-measuring sensors braced radially between each of the bars and the roll body.

2. The flatness-measuring roll defined in claim 1, wherein the sensor bars each have a greater total angular length at least twice as great as the bar's axial width.

3. The flatness-measuring roll defined in claim 2, wherein the sensor bars rest on two of the force-measuring sensors that are in a row extending angularly.

4. The flatness-measuring roll defined in claim 1, wherein a plurality of axially extending groups each of a plurality of the measuring bars spaced axially are recessed with respective force-measuring sensors in the roll body.

5. The flatness-measuring roll defined in claim 4, wherein the groups are angularly spaced from one another around the roll body.

6. The flatness-measuring roll defined in claim 5, wherein at least some of the bars of each group are axially offset from the bars of an adjacent group.

7. The flatness-measuring roll defined in claim 6, wherein all of the groups have at least one bar axially aligned with one bar of each of the other groups, all of the one bars lying on a common plane perpendicular to the axis.

8. The flatness-measuring roll defined in claim 5, wherein each group has at least five of the measuring bars.

9. The flatness-measuring roll defined in claim 1 wherein each measuring bar width measured parallel to the axis of 10 mm to 50 mm and an angular length of 50 mm to 300 mm.

10. The flatness-measuring roll defined in claim 1, wherein the sensor bars have an angular length equal to 5% to 20% of a diameter of the roll body.

11. The flatness-measuring roll defined in claim 1, wherein the measuring bars are spaced apart axially by 20 mm to 100 mm.

12. The flatness-measuring roll defined in claim 1, wherein the roll is formed with cavities each holding a respective one of the sensor bars and the sensor bars are spacedly held in the respective cavities so as not to be in direct contact with the roll body.

13. A method of determining flatness defects of a strip using a flatness-measuring roll comprising:
    a roll body having a cylindrical outer surface and a central axis;
    a plurality of measuring bars axially spaced along the body, recessed in the body, having outer faces flush with the body surface, and each at least limitedly radially shiftable relative to the body, the bars being angularly elongated and each extending along a plane substantially perpendicular to the roll axis and each having of a constant width measure parallel to the roll axis over generally all of a respective total angular length;
    at least two respective force-measuring sensors braced radially between each of the bars and the roll body, the method comprising the steps of:
    passing the strip over the roll body in a strip-travel direction substantially perpendicular to a vertical plane including the axis such that the strip entrains and rotates the body, whereby the strip passes over the sensor bars and radially inwardly presses the sensor bars;
    detecting the radial inward pressure exerted on the sensor bars with the force-measuring sensors and thereby determining flatness defects in the strip across a strip width perpendicular to the travel direction.

14. The method defined in claim 13, further comprising the step of:
    averaging for each axial position along the roll of a respective one of the sensor bars, all of the outputs of the respective sensors over multiple revolutions of the roll body.

15. The method defined in claim 13, wherein the strip is tensioned and positioned such that it wraps and directly engages the roll body over an arc that is shorter than the total angular length of the sensor bars.

16. The method defined in claim 13, further comprising the step of:
    resetting the force-measuring sensors once for each revolution of the roll body about the roll axis.

* * * * *